(12) United States Patent
Wilton et al.

(10) Patent No.: US 10,473,210 B2
(45) Date of Patent: Nov. 12, 2019

(54) SEALED LOW LEAK CONTROLS SYSTEM IN AN AUTOMATIC TRANSMISSION

(71) Applicant: GM Global Technology Operations LLC, Detroit, MI (US)

(72) Inventors: Daryl A. Wilton, Macomb, MI (US); James M. Hart, Belleville, MI (US); Eric C. Sandstrom, Oxford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 648 days.

(21) Appl. No.: 15/239,349

(22) Filed: Aug. 17, 2016

(65) Prior Publication Data

US 2018/0051796 A1    Feb. 22, 2018

(51) Int. Cl.
| | |
|---|---|
| *F16H 57/04* | (2010.01) |
| *F16H 61/30* | (2006.01) |
| *F16H 3/66* | (2006.01) |
| *F16H 57/10* | (2006.01) |
| *F16H 61/00* | (2006.01) |
| *F16H 57/08* | (2006.01) |

(52) U.S. Cl.
CPC ..... *F16H 57/0454* (2013.01); *F16H 57/0412* (2013.01); *F16H 57/0436* (2013.01); *F16H 57/0441* (2013.01); *F16H 61/0025* (2013.01); *F16H 61/30* (2013.01); *F16H 3/66* (2013.01); *F16H 57/045* (2013.01); *F16H 57/0473* (2013.01); *F16H 57/0484* (2013.01); *F16H 57/10* (2013.01); *F16H 2057/087* (2013.01); *F16H 2061/0037* (2013.01); *F16H 2200/201* (2013.01); *F16H 2200/2043* (2013.01)

(58) Field of Classification Search
None
See application file for complete search history.

(56) References Cited

U.S. PATENT DOCUMENTS

| | | | | |
|---|---|---|---|---|
| 4,794,883 A | * | 1/1989 | Fukami | B62D 5/07 123/41.12 |
| 6,234,125 B1 | * | 5/2001 | Neubauer | B62D 5/07 123/196 M |
| 6,358,174 B1 | * | 3/2002 | Folsom | F16H 47/04 475/72 |
| 6,361,287 B1 | * | 3/2002 | Hopper | F04B 17/05 417/286 |
| 8,322,135 B2 | * | 12/2012 | Kure | E02F 9/2242 60/422 |
| 2004/0112171 A1 | * | 6/2004 | Kuhstrebe | B60K 6/547 74/730.1 |
| 2010/0075794 A1 | | 3/2010 | McConnell et al. | |
| 2011/0176932 A1 | * | 7/2011 | Schultz | F16H 61/0031 417/15 |

(Continued)

Primary Examiner — Colby M Hansen

(57) ABSTRACT

A transmission sealed low leak controls system includes a controls system having a first fluid for operation of the controls system provided by a first pump at a first pressure. A transmission input shaft is provided. A planetary gear set is connected to the transmission input shaft by a clutch assembly. A second pump provides a second fluid different from the first fluid for cooling and lubrication of the at least one clutch assembly at a second pressure lower than the first pressure. A torque converter is connected to the transmission input shaft. The second pump further provides the second fluid to the torque converter.

18 Claims, 3 Drawing Sheets

(56) References Cited

U.S. PATENT DOCUMENTS

2012/0055146 A1* 3/2012 Baraga ............... F16H 61/0031
60/327
2014/0234124 A1* 8/2014 Ruhle ..................... F01P 5/10
417/53

* cited by examiner

SEALED LOW LEAK CONTROLS SYSTEM IN AN AUTOMATIC TRANSMISSION

FIELD

The present disclosure relates to control systems used in automobile automatic transmissions.

BACKGROUND

The statements in this section merely provide background information related to the present disclosure and may or may not constitute prior art.

A multiple-speed automatic transmission commonly provides a single, high pressure hydraulic fluid pump to provide all flow of hydraulic fluid to the components of the transmission. Portions of the transmission such as the controls system require a high pressure, low volume flow of fluid. Other portions of the transmission such as the clutch assemblies and the torque converter require only a low pressure, but a high flow rate of hydraulic fluid. The single, high pressure hydraulic fluid pump therefore provides fluid flow at a pressure that must be regulated to a lower pressure for most uses, thereby inherently incurring system inefficiency.

The clutch assemblies of known automatic transmissions also commonly include rotating clutch members which require rotational seals. Rotational seals inherently leak, which provides a further system inefficiency and loss.

Thus, while current automatic transmission control systems achieve their intended purpose, there is a need for a new and improved system and method for reducing high pressure oil usage and thereby to improve fuel economy.

SUMMARY

According to several aspects, a transmission sealed low leak controls system includes a controls system having a fluid for operation of the controls system provided by a first pump. A transmission input shaft is provided. At least one planetary gear set is connected to the transmission input shaft by at least one clutch assembly. A second pump provides a fluid for cooling and lubrication of the at least one clutch assembly.

In an additional aspect of the present disclosure, the fluid for operation of the controls system is different from the fluid for cooling and lubrication of the at least one clutch assembly.

In another aspect of the present disclosure, the fluid for operation of the controls system is a synthetic fluid and the fluid for cooling and lubrication of the at least one clutch assembly is a hydraulic fluid different from the synthetic fluid.

In another aspect of the present disclosure, the first pump defines a high pressure pump operating at a pressure greater than or equal to approximately 100 psi, and the second pump defines a low pressure pump operating at a pressure less than or equal to approximately 50 psi.

In another aspect of the present disclosure, a first reservoir and a second reservoir are included. The fluid for operation of the controls system is collected in the first reservoir and is segregated by the second reservoir from the fluid for cooling and lubrication of the at least one clutch assembly.

In another aspect of the present disclosure, the first pump defines a high pressure pump and the second pump defines a low pressure pump operating at a pressure lower than a pressure of the high pressure pump. Both the high pressure pump and the low pressure pump are directly driven by an engine driven shaft.

In another aspect of the present disclosure, a torque converter is connected to the transmission input shaft, wherein the second pump further provides the fluid to the torque converter.

In another aspect of the present disclosure, the at least one clutch assembly includes a piston; a hub co-rotating with the at least one clutch assembly; and a rotational bearing directly transferring a displacement motion of the piston to the hub.

In another aspect of the present disclosure, the at least one clutch assembly includes a biasing member acting to continuously bias the hub away from frictional members of at least one clutch assembly.

In another aspect of the present disclosure, a transmission housing has a piston chamber, with the piston slidably disposed within the piston chamber.

In another aspect of the present disclosure, a piston seal is provided, wherein the piston is slidably movable in the piston chamber of the transmission housing and sealed against the piston chamber by the piston seal.

In another aspect of the present disclosure, the first pump is connected to and directly rotated by rotation of an engine driven shaft.

In another aspect of the present disclosure, the second pump is connected to and directly rotated by rotation of the engine driven shaft.

In another aspect of the present disclosure, a transmission sealed low leak controls system includes a controls system having a fluid for operation of the controls system provided by a first pump at a first pressure. A transmission input shaft and at least one planetary gear set are provided. At least one clutch assembly connects the at least one planetary gear set to the transmission input shaft. The at least one clutch assembly includes: a slidably displaceable piston; and a hub co-rotating with the at least one clutch assembly and contacted by the piston in a clutch engaged condition. A second pump provides a fluid for cooling and lubrication of the at least one clutch assembly at a second pressure lower than the first pressure.

According to several aspects, the fluid for operation of the controls system is different from the fluid for cooling and lubrication of the at least one clutch assembly.

In another aspect of the present disclosure, the fluid for operation of the controls system is stored in a first reservoir and the fluid for cooling and lubrication of the at least one clutch assembly is stored in a second reservoir.

In another aspect of the present disclosure, the first pump is connected by a chain to an engine driven shaft and directly rotated by rotation of the engine driven shaft.

In another aspect of the present disclosure, the second pump is connected to and is directly rotated by rotation of the engine driven shaft.

In another aspect of the present disclosure, the at least one clutch assembly further includes a rotational bearing directly transferring a displacement motion of the piston to the hub.

According to several aspects, a transmission sealed low leak controls system includes a controls system having a first fluid for operation of the controls system provided by a first pump at a first pressure. A transmission input shaft and at least one planetary gear set are provided. At least one clutch assembly connects the at least one planetary gear set to the transmission input shaft. A second pump provides a second fluid different from the first fluid for cooling and lubrication of the at least one clutch assembly at a second pressure lower than the first pressure. A torque converter is connected to the transmission input shaft, wherein the second pump further provides the second fluid to the torque converter.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
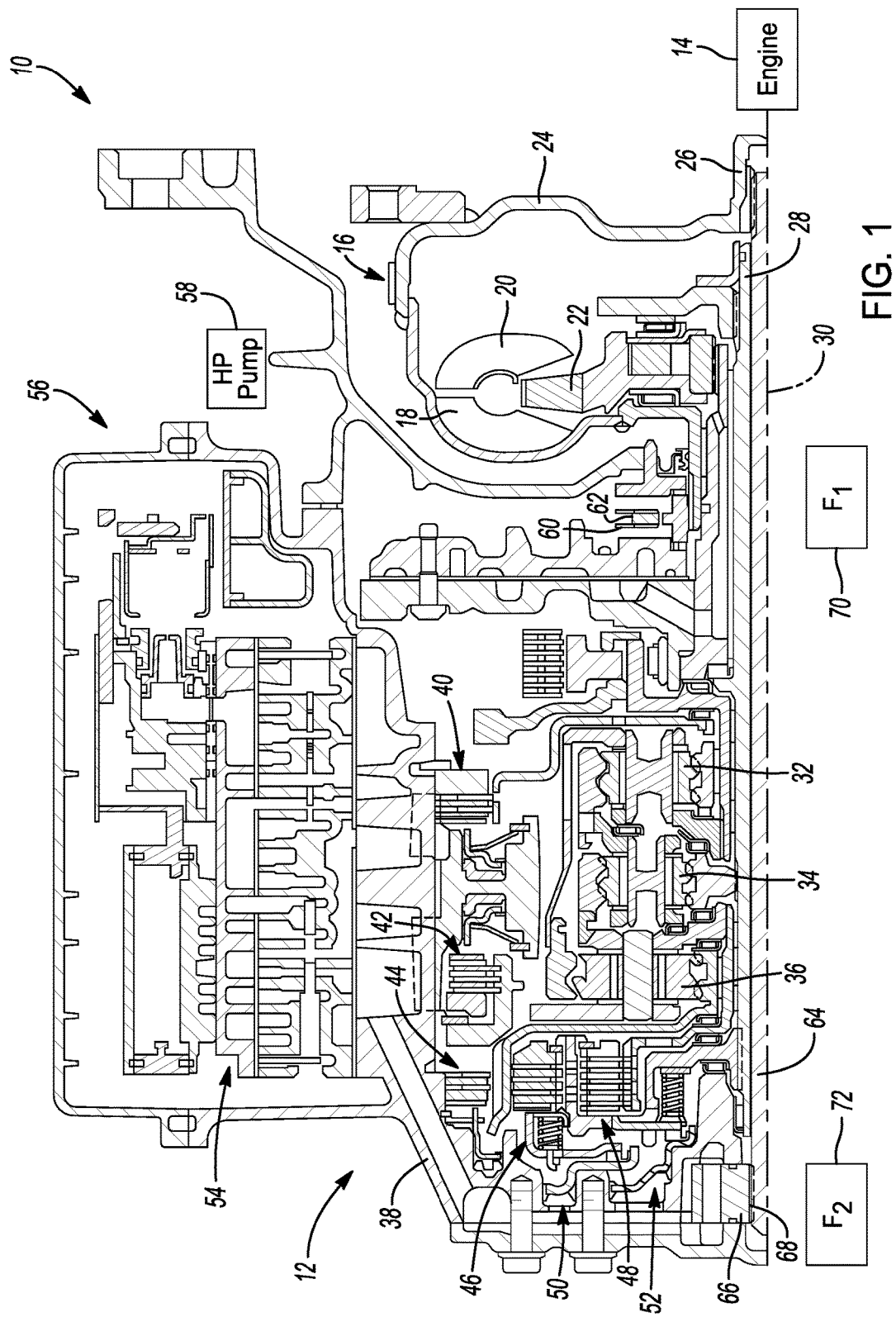
FIG. 1 is a partial cross sectional front elevational view of a transmission having a sealed low leak controls system of the present disclosure.

Referring to FIG. 1, a transmission sealed low leak controls system 10 is provided in a transmission 12 which receives drive force from a prime mover 14 such as a reciprocating engine or an electrical motor. A torque converter 16 transfers rotational energy of the prime mover 14 and generally includes a pump 18, a turbine 20, and a stator 22 positioned within a torque converter housing 24. The pump 18 is coupled to the torque converter housing 24 and is driven by a prime mover drive component 26. The turbine 20 is fluidly driven by rotation of the pump 18. The stator 22 is located between the pump 18 and the turbine 20 and is used to multiply torque within the torque converter 16. An output from the torque converter 16 is delivered to a transmission input shaft 28 which is rotatably disposed with respect to a longitudinal axis of rotation 30.

The transmission 12 can include one or multiple gear sets, and according to several aspects includes a first planetary gear set 32, a second planetary gear set 34, and a third planetary gear set 36 all positioned in a transmission housing 38 and delivering output torque to the transmission input shaft 28. The quantity of planetary gear sets is not limiting. Gear changes together with forward and reverse directional changes are accomplished using combinations of multiple clutch assemblies, which can include a first clutch assembly 40, a second clutch assembly 42, a third clutch assembly 44, a fourth clutch assembly 46, and a fifth clutch assembly 48. It is noted that rotating clutch housings have been totally eliminated in the transmission 12 to eliminate the requirement for rotating seals and to minimize hydraulic fluid loss associated with rotating seals.

In several of the clutch assemblies stationary piston assemblies are used in lieu of rotating seals. For example the fourth clutch assembly 46 is actuated by a first stationary piston assembly 50 and the fifth clutch assembly 48 is actuated by a second stationary piston assembly 52. The first stationary piston assembly 50 and the second stationary piston assembly 52 are defined as "stationary" component assemblies due to the fact that they do not rotate independently of the transmission housing, and therefore do not require rotating seals at their mounting locations with respect to the transmission housing 38.

Hydraulic fluid control for operation of the transmission 12 is provided by a controls system 54 positioned in a controls system housing portion 56 of the transmission housing 38. A high pressure "$P_1$" fluid for operation of the controls system 54 is provided by a first or high pressure pump 58, which can be positioned as an off-axis pump driven by a chain 60 (only partially shown) connected to a sprocket 62 which is directly rotated by rotation of an engine driven shaft 64. According to several aspects, the high pressure pump 58 can be mechanically or also electrically driven. The use of an electric high pressure pump would also enable "start-stop" and "sailing" operations. By eliminating rotational seals, the reduced volumetric envelope required by the first stationary piston assembly 50 and the second stationary piston assembly 52 compared to the space envelope of known rotating clutch housings, additional space envelope is available within the transmission housing 38 proximate to the first stationary piston assembly 50 and the second stationary piston assembly 52. A second or low pressure pump 66 is positioned within this available space envelope which is directly driven by the engine driven shaft 64 using for example a spline 68.

The low pressure pump 66 is continuously operated to feed a high volume, low pressure "$P_2$" (e.g., approximately 30 psi) flow required to lubricate components of the transmission 12 and for hydraulic flow to the torque converter 16. This permits separation of the hydraulic fluid required for the low pressure components from components requiring a low volume, high pressure (e.g., approximately 300 psi) fluid such as required for operation of the controls system 54. A lower viscosity first fluid "$F_1$", such as a synthetic transmission fluid manufactured by Pentosin-Werke GmbH of Hamburg, Germany can be used for the low volume, high pressure controls system 54 which is collected in a first reservoir 70 or sump. The first fluid "$F_1$" is segregated from a second fluid "$F_2$" defining an hydraulic fluid different from the first fluid "$F_1$", which is received by a second reservoir 72 or sump used to collect fluid for the low pressure components. According to several aspects, the first pump 58 defines a high pressure pump operating at a pressure "$P_1$" greater than or equal to approximately 100 psi, and the second pump 66 defines a low pressure pump operating at a pressure "$P_2$" less than or equal to approximately 50 psi.

Referring to FIG. 2 and again to FIG. 1, the first stationary piston assembly 50 and the second stationary piston assembly 52 may differ in their operation from the operation of the remaining clutch assemblies. The first stationary piston assembly 50 includes a piston 76 slidably movable in a piston chamber 78 of the transmission housing 38 and sealed by a piston seal 80. Pressurized fluid acting in a piston cylinder 82 displaces the piston 76 which directly transfers its displacement motion via a rotational bearing 84 to a hub 86 which in turn displaces friction members of the fourth clutch assembly 46. A biasing member 88 compresses as the hub 86 is displaced, such that the biasing force of the biasing member 88 returns the hub 86 and the piston 76 to the left as viewed in FIG. 2 when the pressurized fluid is bled from the piston cylinder 82. The rotational bearing 84 allows sliding displacement of the piston 76 to be connected to the rotating friction components of the fourth clutch assembly 46.

Similarly, the second stationary piston assembly 52 includes a piston 90 slidably movable in a piston chamber 92 of the transmission housing 38 and sealed by a piston seal 94. Pressurized fluid acting in a piston cylinder 96 displaces the piston 90 which directly transfers its displacement motion via a rotational bearing 98 to a hub 100 which in turn displaces friction members of the fifth clutch assembly 48. A biasing member 102 compresses as the hub 100 is displaced, such that the biasing force of the biasing member 102 returns the hub 100 and the piston 90 to the left as viewed in FIG. 2 when the pressurized fluid is bled from the piston cylinder 96. The rotational bearing 98 allows sliding displacement of the piston 90 to be connected to the rotating friction components of the fifth clutch assembly 48.

In contrast to the fourth clutch assembly 46 and the fifth clutch assembly 48, rotational bearings are not required by the remaining clutch assemblies, including for the third clutch assembly 44. The third clutch assembly 44 includes a piston 104 which directly contacts the friction components of the third clutch assembly 44. Pressurized fluid received in a piston cylinder 106 displaces the piston 104 against the biasing force of a biasing member 108.

Elimination of clutch assembly rotating seals permits the low pressure pump 66 to positioned in a cavity 110 typically used to house clutch assembly rotating seals located between a transmission housing portion 112 and a transmission cover 114. One or more pump seals 116 can be used to separate the low pressure pump 66 in the cavity 110 from the transmission input shaft 64.

Figure 2:
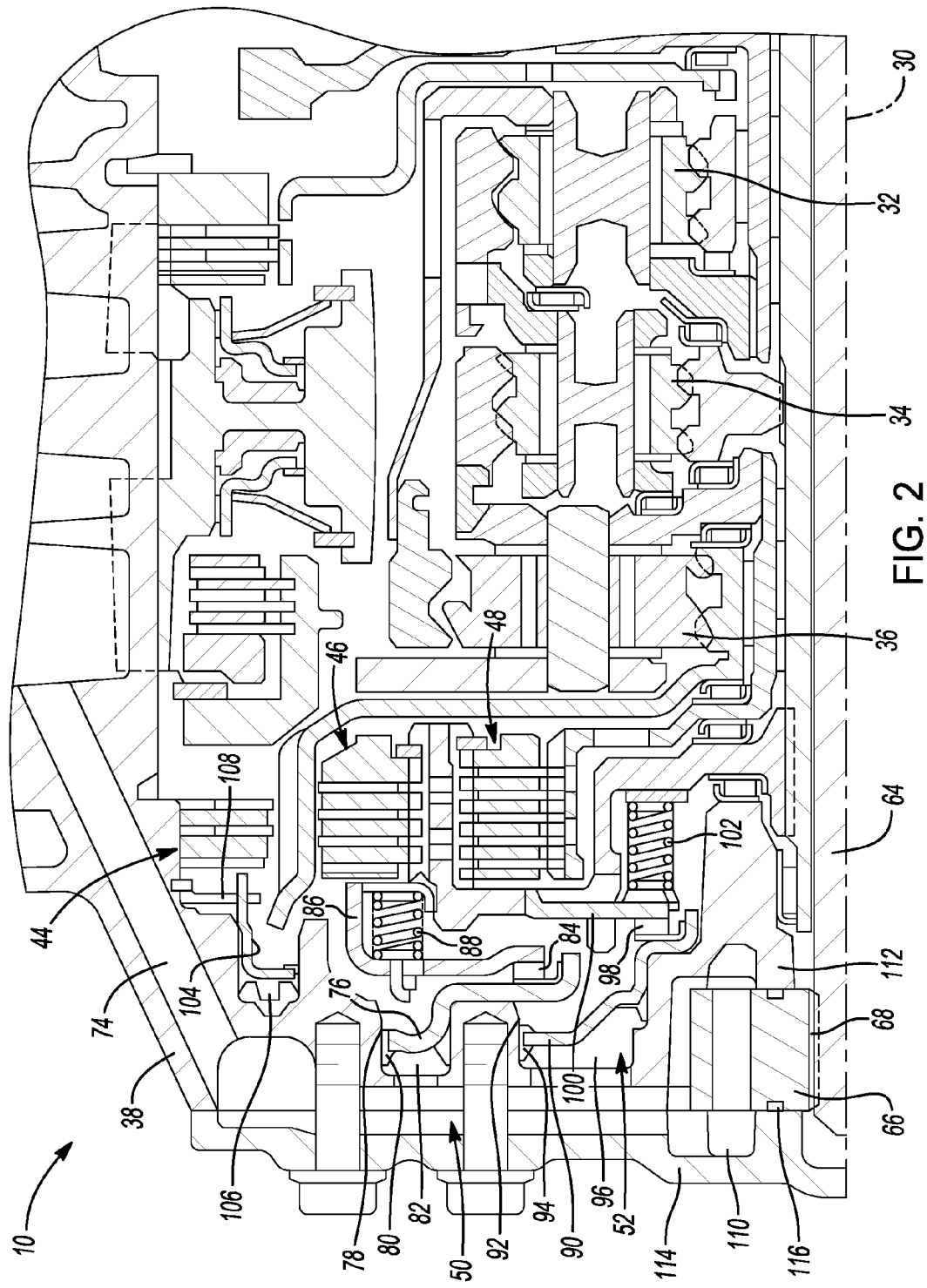
FIG. 2 is a partial cross sectional front elevational view taken at area 2 of FIG. 1.
Figure 3:
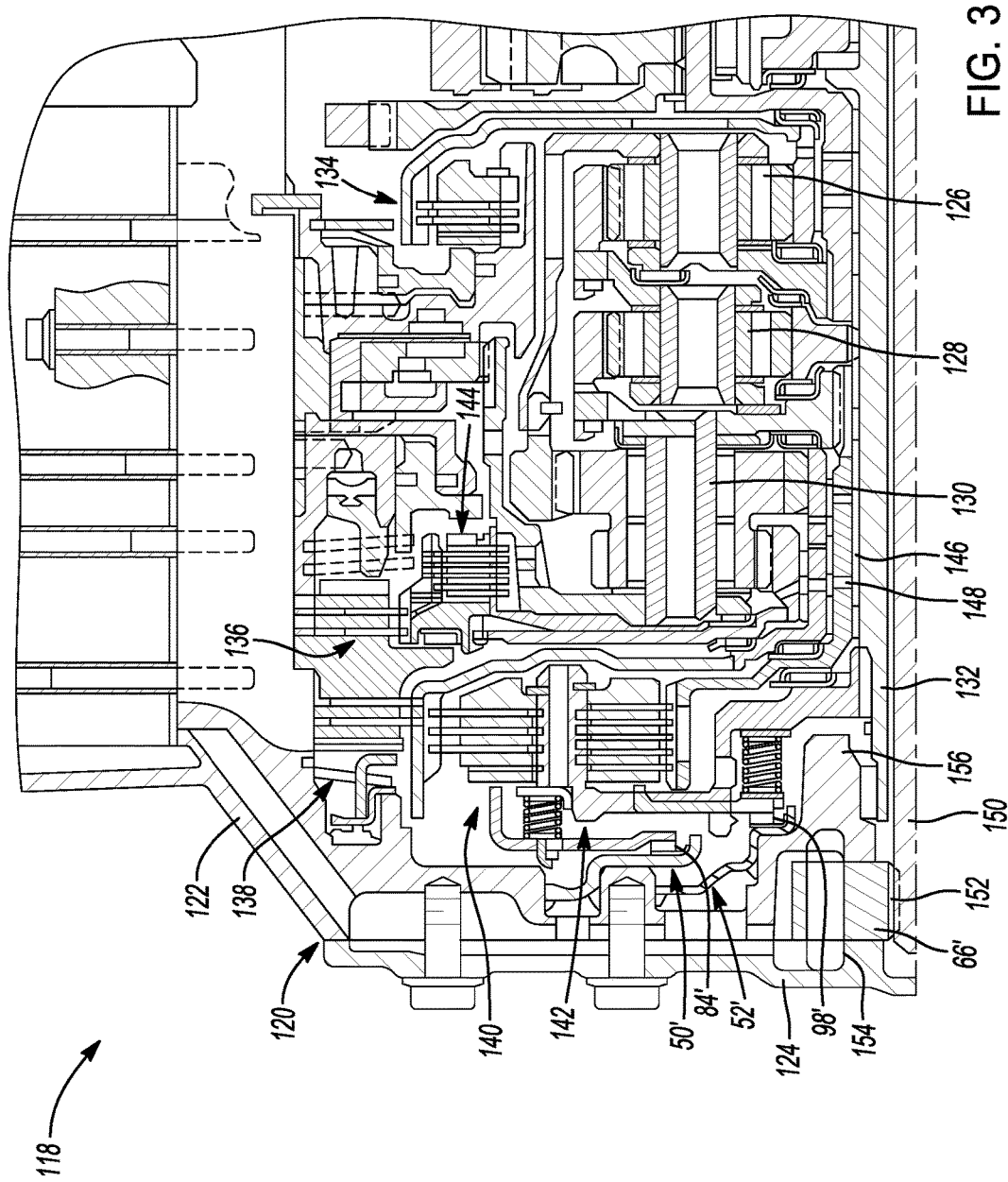
FIG. 3 is a partial cross sectional front elevational view of another aspect of a sealed low leak controls system of the present disclosure.

Referring to FIG. 3 and again to FIGS. 1 through 2, a transmission sealed low leak controls system 118 is modified from the transmission sealed low leak controls system 10, having common items identified using an apostrophe, therefore only the differences will be further discussed herein. The transmission sealed low leak controls system 118 includes a transmission 120 having a transmission housing 122 and a transmission cover 124. A first planetary gear set 126, a second planetary gear set 128, and a third planetary gear set 130 are rotatably connected to a transmission input shaft 132. The transmission 120 includes six clutch assemblies, including a first clutch assembly 134, a second clutch assembly 136, a third clutch assembly 138, a fourth clutch assembly 140, a fifth clutch assembly 142, and a sixth clutch assembly 144. The fourth clutch assembly 140 is actuated by a first stationary piston assembly 50' having a rotational bearing 84' and a second stationary piston assembly 52' having a rotational bearing 98'.

Low pressure hydraulic fluid flow to various components including the planetary gear sets is provided via a fluid distribution path 146 and multiple individual flow passages 148 which communicate with the fluid distribution path 146. Similar to the transmission sealed low leak controls system 10 the low pressure pump 66' is directly driven by an engine driven shaft 150 using for example a spline 152. Elimination of clutch assembly rotating seals permits the low pressure pump 66' to positioned in a cavity 154 typically used to house clutch assembly rotating seals located between a transmission housing portion 156 and the transmission cover 124.

It is noted that the sealed low leak controls system of the present disclosure offers several advantages including provision of both a high pressure and a low pressure pump. The advantages also include efficiency improvement, elimination of rotating seals on clutches that require continuous lubrication, and reducing pumping losses in the high pressure shifting systems circuits. Leakage associated with rotating seals is reduced and the provision of a low pressure pump for lubrication, torque converter cooling and TCC apply systems reduces the demand on the high pressure pump. The sealed low leak controls system of the present disclosure also allows the use of a second, lower cost oil in the transmission, such as but not limited to a Pentosin® type synthetic oil for example in the shifting/controls system, without limiting the lubrication and cooling oil required for operation of the gears and bearings in the gearbox that are retained. Because stationary pistons are significantly shorter than rotating pistons, the stationary piston designs of the present disclosure also reduce a length and a diameter of the transmission, thereby providing a packaging improvement for the motor vehicle. The high pressure controls pump can be either electrically or mechanically driven. The use of an electric high pressure pump would also enable "Start Stop" and "Sailing" operations.

According to several aspects of the present disclosure, a sealed low leak controls system 10 includes a controls system 54 having a first fluid $F_1$ for operation of the controls system provided by a first pump 58 at a first pressure "$P_1$". A transmission input shaft 28 and at least one planetary gear set 32, 34, 36 are provided with at least one clutch assembly 40, 42, 44, 46, 48 connecting the at least one planetary gear set 32, 34, 36 to the transmission input shaft 28. A second pump 66 provides a second fluid $F_2$ different from the first fluid $F_1$ for cooling and lubrication of the at least one clutch assembly 40, 42, 44, 46, 48 at a second pressure "$P_2$" lower than the first pressure "$P_1$". A torque converter 16 is connected to the transmission input shaft 28 and the second pump 66 further provides the second fluid $F_2$ to the torque converter 16.

The description of the invention is merely exemplary in nature and variations that do not depart from the gist of the invention are intended to be within the scope of the invention. Such variations are not to be regarded as a departure from the spirit and scope of the invention.

What is claimed is:

1. A transmission sealed low leak controls system, comprising:
   a controls system having a fluid for operation of the controls system provided by a first pump;
   a transmission input shaft;
   at least one planetary gear set;
   at least one clutch assembly connecting the at least one planetary gear set to the transmission input shaft; and
   a second pump providing a fluid for cooling and lubrication of the at least one clutch assembly,
   wherein the fluid for operation of the controls system is different from the fluid for cooling and lubrication of the at least one clutch assembly.

2. The transmission sealed low leak controls system of claim 1, wherein the fluid for operation of the controls system is a synthetic fluid and the fluid for cooling and lubrication of the at least one clutch assembly is a hydraulic fluid different from the synthetic fluid.

3. The transmission sealed low leak controls system of claim 1, wherein the first pump defines a high pressure pump operating at a pressure greater than or equal to 300 psi, and the second pump defines a low pressure pump operating at a pressure less than or equal to 50 psi.

4. The transmission sealed low leak controls system of claim 1, further including a first reservoir and a second reservoir, wherein the fluid for operation of the controls system is collected in the first reservoir and is segregated by the second reservoir from the fluid for cooling and lubrication of the at least one clutch assembly.

5. The transmission sealed low leak controls system of claim 1, wherein the first pump defines a high pressure pump and the second pump defines a low pressure pump operating at a pressure lower than a pressure of the high pressure pump, both the high pressure pump and the low pressure pump directly driven by an engine driven shaft.

6. The transmission sealed low leak controls system of claim 1, further including a torque converter connected to the transmission input shaft, wherein the second pump further provides the fluid for cooling and lubrication to the torque converter.

7. The transmission sealed low leak controls system of claim 1, wherein the at least one clutch assembly includes:
   a piston;
   a hub co-rotating with the at least one clutch assembly; and
   a rotational bearing directly transferring a displacement motion of the piston to the hub.

8. The transmission sealed low leak controls system of claim 7, wherein the at least one clutch assembly includes a biasing member acting to continuously bias the hub away from frictional members of at least one clutch assembly.

9. The transmission sealed low leak controls system of claim 7, further including a transmission housing having a piston chamber, with the piston slidably disposed within the piston chamber.

10. The transmission sealed low leak controls system of claim 9, further including a piston seal, wherein the piston is slidably movable in the piston chamber of the transmission housing and sealed against the piston chamber by the piston seal.

11. The transmission sealed low leak controls system of claim 1, wherein the first pump is connected to and directly rotated by rotation of an engine driven shaft.

12. The transmission sealed low leak controls system of claim 11, wherein the second pump is connected to and directly rotated by rotation of the engine driven shaft.

13. A transmission sealed low leak controls system, comprising:
   a controls system having a fluid for operation of the controls system provided by a first pump at a first pressure;
   a transmission input shaft;
   at least one planetary gear set;
   at least one clutch assembly connecting the at least one planetary gear set to the transmission input shaft, the at least one clutch assembly including:
      a slidably displaceable piston; and
      a hub co-rotating with the at least one clutch assembly and contacted by the piston in a clutch engaged condition; and
   a second pump providing a fluid for cooling and lubrication of the at least one clutch assembly at a second pressure lower than the first pressure,
   wherein the fluid for operation of the controls system is different from the fluid for cooling and lubrication of the at least one clutch assembly.

14. The transmission sealed low leak controls system of claim 13, wherein the fluid for operation of the controls system is stored in a first reservoir and the fluid for cooling and lubrication of the at least one clutch assembly is stored in a second reservoir.

15. The transmission sealed low leak controls system of claim 13, wherein the first pump is connected by a chain to an engine driven shaft and directly rotated by rotation of the engine driven shaft.

16. The transmission sealed low leak controls system of claim 15, wherein the second pump is connected to and is directly rotated by rotation of the engine driven shaft.

17. The transmission sealed low leak controls system of claim 13, wherein the at least one clutch assembly further includes a rotational bearing directly transferring a displacement motion of the piston to the hub.

18. A transmission sealed low leak controls system, comprising:
   a controls system having a first fluid for operation of the controls system provided by a first pump at a first pressure;
   a transmission input shaft;
   at least one planetary gear set;
   at least one clutch assembly connecting the at least one planetary gear set to the transmission input shaft;
   a second pump providing a second fluid different from the first fluid for cooling and lubrication of the at least one clutch assembly at a second pressure lower than the first pressure; and
   a torque converter connected to the transmission input shaft, wherein the second pump further provides the second fluid to the torque converter.

\* \* \* \* \*